Figure 1A:
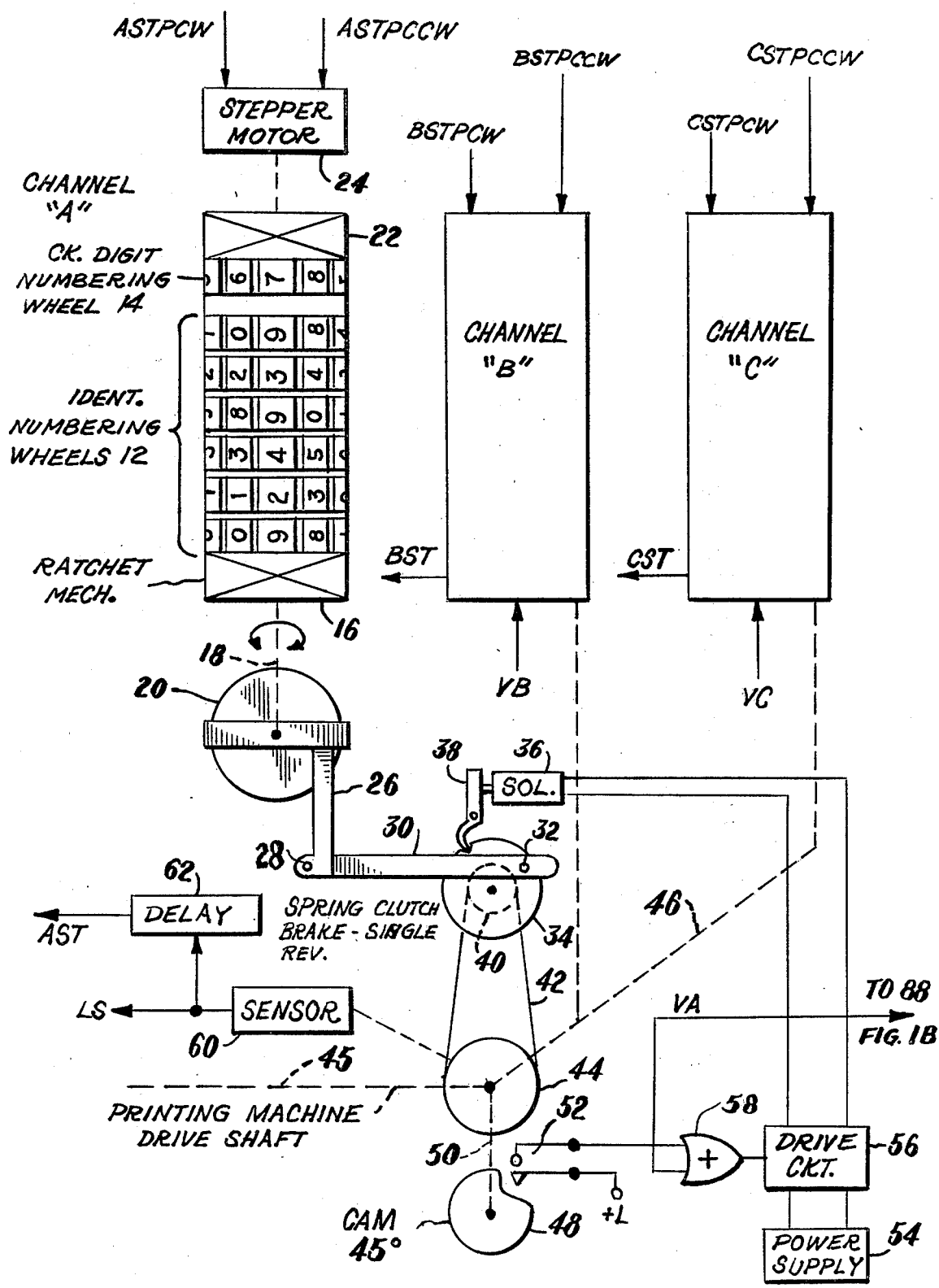

United States Patent [19]

Eglowstein et al.

[11] 4,328,746
[45] May 11, 1982

[54] WEIGHTED MODULUS NUMBERING APPARATUS

[75] Inventors: Ira Eglowstein; Peter E. Solender, both of Williamsville, N.Y.

[73] Assignee: Interface Systems, Inc., Williamsville, N.Y.

[21] Appl. No.: 131,876

[22] Filed: Mar. 20, 1980

Related U.S. Application Data

[63] Continuation-in-part of Ser. No. 871,778, Jan. 24, 1978, Pat. No. 4,202,265.

[51] Int. Cl.³ .............................................. B41L 45/00
[52] U.S. Cl. ........................................ 101/72; 371/54; 101/79; 235/92 EC
[58] Field of Search ...................... 101/72, 76, 77, 79, 101/82, 84, 85, 93.11, 110; 235/92 EC, 61.7 R, 431; 371/53, 54, 71; 364/738

[56] References Cited

U.S. PATENT DOCUMENTS

| | | | |
|---|---|---|---|
| 2,684,199 | 7/1954 | Starreveld | 371/53 |
| 3,571,581 | 3/1971 | Kaus et al. | 371/53 |
| 3,650,205 | 3/1972 | Hybrow et al. | 371/53 X |
| 3,669,015 | 6/1972 | Kingspor et al. | 101/76 |
| 3,778,766 | 12/1973 | Rapp | 371/53 |
| 3,815,495 | 6/1974 | Strackbein | 101/79 X |
| 3,833,795 | 9/1974 | Shoshani et al. | 101/72 |
| 4,085,670 | 4/1978 | Poole | 101/76 |
| 4,202,265 | 5/1980 | Eglowstein et al. | 101/72 |
| 4,236,446 | 12/1980 | Lovrich et al. | 101/79 |

OTHER PUBLICATIONS

Lavin et al., IBM Tech. Discl. Bulletin, vol. 10, No. 12, May, 1968, pp. 1872-1873.

Primary Examiner—Edward M. Coven
Attorney, Agent, or Firm—Joseph P. Gastel; Martin LuKacher

[57] ABSTRACT

Weighted modulus numbering apparatus is capable of printing composite numbers consisting of serial identification numbers and accompanying check digits which are determined in accordance with a system where the check digits for certain identification numbers may be invalid, as by requiring a two-digit number rather than an allowable single-digit number. The check digits are generated in the form of digital (for example, binary) words and decoded to provide a signal representing the validity or invalidity of the check digit. A memory stores the check digit words and a bit representing the validity/invalidity of the check digit. The decoding of an invalid check digit operates to cause the word representing the check digit for the next successive identification number to be stored with the valid/invalid bit in memory. The numbering machine, which presents the successive identification numbers for printing, is caused to increment twice in response to a signal representing an invalid check digit. Since the check digit word stored with the signal representing the invalid check digit represents the check digit for the next successive identification number, a check digit numbering wheel is positioned in response to that check digit word and will print the proper check digit for the next successive identification number and also a valid check digit.

7 Claims, 2 Drawing Figures

FIG. 1A

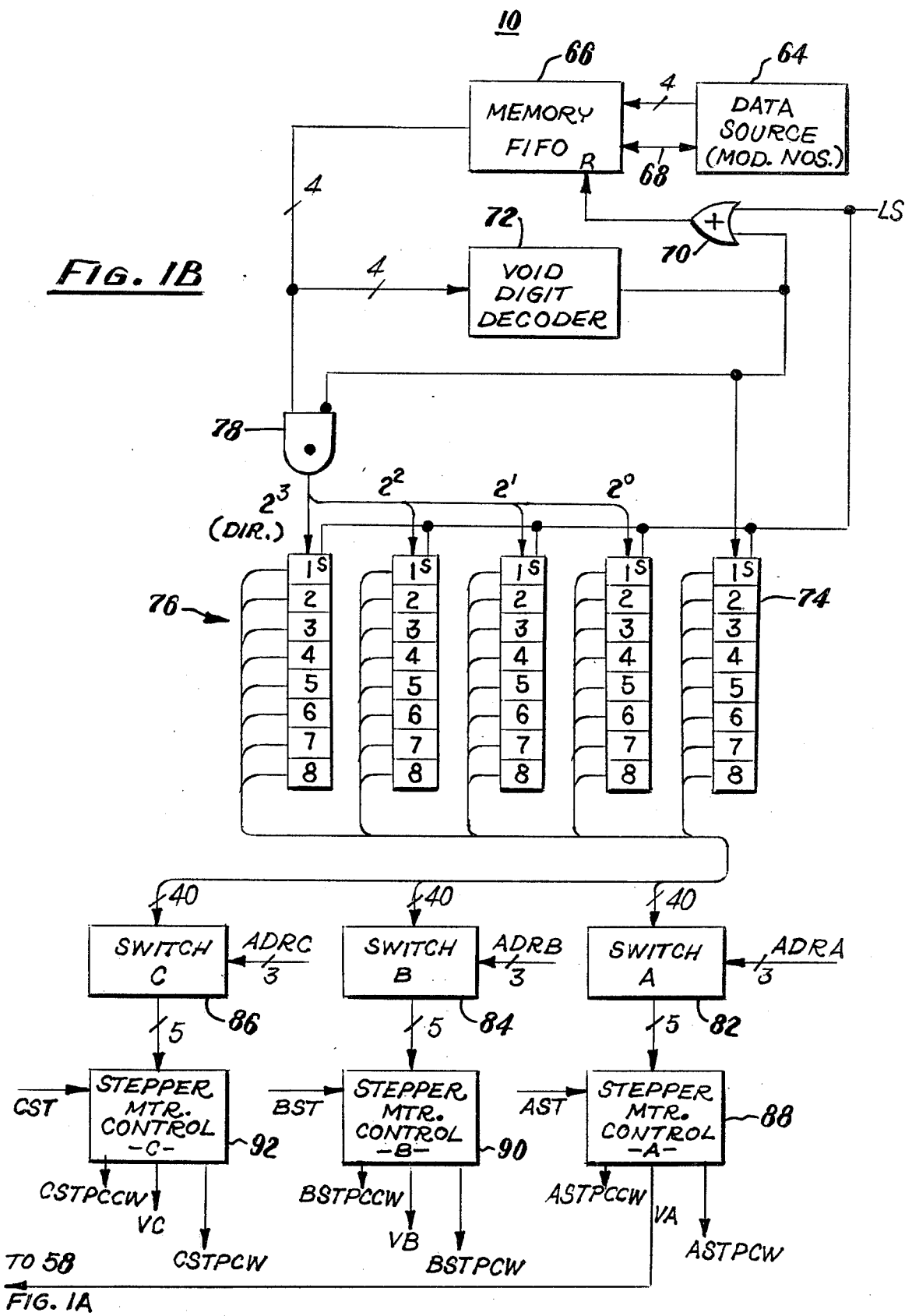

WEIGHTED MODULUS NUMBERING APPARATUS

The present invention is a continuation in part of our application Ser. No. 871,778, filed Jan. 24, 1978, now U.S. Pat. No. 4,202,265, issued May 13, 1980.

DESCRIPTION

The present invention relates to weighted modulus numbering apparatus for printing composite numbers consisting of serial identification numbers and check digits on documents such as checks, bonds and other instruments and particularly to apparatus for printing serial numbers simultaneously on a plurality of documents, each of which has a different one of such serial numbers.

Our prior application describes a weighted modulus numbering system whereby composite numbers consisting of serial, consecutive multi-digit identification numbers and a check digit determined in accordance with a weighted modulus system are printed simultaneously on a plurality of different documents such that the documents can be printed at high speeds. The disclosures of U.S. Pat. Nos. 3,650,205 and 3,833,795 cited in our prior application describe machines for generating and printing identification numbers and check digits.

Serial numbers consisting of identification numbers and check digits are used for verifying the proper entry of data from the documents containing them, such that information from these documents can be processed on automatic data processing equipment with the assurance that the information entered into the equipment is attributed to the proper document. The weighted modulus system is used to insure that any mistake, such as the transposition or entry of an improper digit, will be detected and can indicate that an error has been made in the entry. Higher order weighted modulus systems provide a higher probability that the composite number will be unique. Unless the numbers are unique to a high probability, errors in entry will not be detected. Higher order weighted modulus systems have not been practicable, however, since they result in check digits which are not valid. As an example, consider the system where the modulus is eleven (Mod. 11). In order to derive the check digit, each digit of the identification number is multiplied by its assigned weighting factor. The product is summed. The sum is divided by 11. The remainder is subtracted from 11 and becomes the check digit. If the remainder is a two-digit number, the check digit is not valid and the entire serial number must be rejected. Inasmuch as the serial numbers are printed on cyclicly operative printing machines, some documents are not properly printed. The documents therefore must be manually sorted and the ones which are improperly printed must be discarded.

It is an object of the present invention to provide an improved apparatus for printing composite numbers which are derived in accordance with a weighted modulus system which can result in invalid numbers.

It is a further object of the present invention to provide improved printing apparatus for printing serial numbers derived in accordance with the high order weighted modulus of 10 or higher (e.g., Mod. 11) which does not result in the printing of invalid numbers.

It is a still further object of the present invention to provide improved apparatus for weighted modulus numbering and the printing of weighted modulus numbers which eliminates the printing of invalid numbers without interferring with the normal cyclical operation of the printing machine.

It is a still further object of the present invention to provide improved weighted modulus numbering apparatus for printing serial numbers where the check digit is determined in accordance with a high order modulus and where a plurality of numbers may be printed simultaneously on a plurality of documents so as to provide for high speed printing of such numbers.

It is a still further object of the present invention to provide improved weighted modulus numbering apparatus which controls a printing machine so as to enable the printing of higher order weighted modulus check digits which may be implemented at low cost.

Briefly described, weighted modulus numbering apparatus, in accordance with the invention, is operative to print a composite number consisting of a check digit with a serial identification number in successive printing cycles using a weighted modulus system which produces invalid check digits for certain identification numbers. Identification number printing means and check digit printing means of the apparatus presents composite numbers consisting of successive identification numbers and their check digits for printing. Means are operative to increment the identification number printing means to selectably present a first or a second successive identification number for printing during each printing cycle. Means are provided for generating successive data words according to the weighted modulus system. These words represent the check digits associated with the successive identification numbers and may include invalid check digits. A computer programmed in accordance with the weighted modulus system may provide these check digit words. Memory means stores these words with digital signals obtained, for example, from a decoder and which represent the validity or invalidity thereof (valid/invalid signals). When the valid/invalid signal represents an invalid check digit, means responsive thereto cause the next successive word to be stored with the valid/invalid signal in memory. First control means for the identification number incrementing means causes it to increment the second successive identification number when the valid/invalid signal represents an invalid check digit, but only to increment once to present the first successive identification number when a valid check digit is indicated. Second control means operates the check digit printing means in response to the digital word stored in memory so as to cause the valid check digit to be printed. In this way a valid serial number is printed during each successive printing cycle of the printing machine in spite of the generation of invalid serial numbers by the computer.

The foregoing and other objects, features and advantages of the invention, as well as a presently preferred embodiment thereof, will become more apparent from a reading of the following description in connection with the accompanying drawing, FIGS. 1A and B of which is a block diagram schematically illustrating weighted modulus numbering apparatus in accordance with a preferred embodiment of the invention.

The weighted modulus numbering apparatus shown in the drawing is arranged in three channels, Channel A, B and C, each of which prints a different serial number on a different document on a web as the web is fed through the printing machine. The printing in each channel may be simultaneous or nearly simultaneous such that the printing of the numbers may be carried out at high speeds. All three channels are controlled by the same control electronics 10. The implementation of the plurality of channels for printing different serial numbers on different documents is described in detail in our above referenced prior application.

Channel A is typical. A set of identification numbering wheels 12 and a check digit numbering wheel 14 are used to print the serial identification number and check digit which constitutes the composite number when a hammer or roller places the documnt in printing engagement therewith. The identification numbering wheels 12 each have faces with the digits 0 to 9 along the periphery thereof. The wheels are interconnected by a ratchet mechanism 16. The ratchet mechanism is operated (by swinging it back and forth) through a cycle by a shaft 18 connected to a disc 20. For each swing or cycle of the shaft 18 and disc 20, the number presented by the wheels 12 is incremented by 1.

The check digit numbering wheel 14 is similar to each of the identification number wheels 12 and is driven through gearing 22 by a stepper motor 24. The stepper motor receives a series of pulses on line ASTPCW to cause the wheel to turn in a clockwise direction or on a line ASTPCCW so as to cause the check digit numbering wheel 14 to turn in a counter-clockwise direction and present the check digit corresponding to the identification number for printing on the document.

The shaft 18 and disc 20 are caused to cyclically swing back and forth by a T-bar crank 26. This crank is connected at a pivot 28 to a crosslink 30. The crosslink 30 is connected at a pivot 32 to a rotary output element 34 of a spring clutch brake mechanism. This mechanism executes a single revolution when a solenoid 36 is actuated to pull in. This solenoid pivots a pawl 38 which causes the spring of the spring clutch to wrap around a shaft which turns the output rotary element 34. The input to the clutch 34 is a pulley 40. This pulley is connected by an endless belt 42 to a drive pulley 44 of twice its diameter. The clutch may be the type CB-2 manufactured by the Warner Electric Brake and Clutch Company of Beloit, Wis. The large pulley 44 is connected to the printing machine drive shaft 45 as are the large pulleys of similar mechanisms in the other channels, Channel B and C, as indicated by the dash line 46.

A cam 48 is connected as by being mounted on the same shaft 50 as the large pulley 44. This cam may have a rise at 45° and actuates a switch 52 which may be a micro-switch mounted adjacent to the cam. When the switch 52 is closed, current from a power supply 54 is connected via a drive circuit 56 to actuate the solenoid 36. The control is obtained by a control voltage indicated at plus L, which is applied to the drive circuit via an OR gate 58. The angular position of the cam on the shaft may be adjusted to precisely time the rotation of the output element 34 and the cyclic swinging of the shaft 18 which causes the number presented by the wheels 12 to increment.

Inasmuch as the diameter of the smaller pulley 40 is half that of the large pulley 44, the rotary output element of the clutch can execute either a single cycle of rotation (360°) or a double cycle of rotation during each cycle of rotation of the printing machine drive shaft 45. Each rotation of the clutch output rotary element 34 results in a cycle of operation of the identification numbering wheels shaft 18. Accordingly, either the first or the second of two successive identification numbers may be presented for printing during each printing cycle. The control sytem 10 provides an output VA to the OR gate 58 which indicates that the check digit is invalid or void. This results in the connection of operating current to the solenoid 36 which causes the output rotary element 34 thereof to execute a second cycle of rotation. This output signal VA remains active for a complete cycle of the printing machine shaft 45 so that the pawl is actuated for two revolutions of the rotary element 34. Consequently, a double oscillation cycle of the shaft 18 may result, causing the next successive identification number to present itself for printing during the same printing cycle before the hammer or roller engages the document with the printing wheels 12 or 14. Accordingly, valid composite numbers only will be printed.

A sensor 60, such as a switch or a magnetic Hall effect pickup in proximity to the pulley 44 outputs a signal indicated as LS or lead signal once each printing cycle. This signal is timed with respect to the application of the hammer or roller to the wheels 12 and 14 such that the wheels come into position in timed relationship to the outputting of the LS signal. The pulley 44 may be rotated on its shaft so as to obtain proper timing. After a delay of the signal from the sensor 60 in a delay circuit 62, the Channel A start signal AST is outputted. This signal enables the application of the control pulses ASTPCW or ASTPCCW to the stepper motor 24 as well as the void signal VA to actuate the solenoid in sufficient time before the actual printing so that the valid identification number can be set up by the incrementing and rotation of the numbering wheels 12 and 14.

The control apparatus 10 has a data source 64, such as a computer, which generates the check digits for each successive identification number. It will be appreciated that during the set up of the apparatus, that the numbering wheels 12 in each Channel A, B and C are advanced so that they will present successive identification numbers in synchronism with the outputting of the check digit numbers therefor from the data source 64. A first in, first out memory 66 interfaces with the data source 64. The check digits are presented as four bit binary words on four lines. Control signals interchanged on control lines 68 between the memory 66 and the data source 64 allow a plurality of the check digit words to be stored in the memory. For example, sixteen words may be stored successively in the memory and outputted on a first in, first out basis on the four output lines. The control lines 68 interface the memory 66 and the data source 64 in handshake fashion so that the next word is inputted into the memory when it is ready to receive. Readout from the memory results when a control signal is applied to its readout terminal R via an OR gate 70. The readout signal may be the LS signal from one of the channels which is indicated as the lead channel. This, for example, may be Channel A. It will be seen, therefore, that a check digit word is read out from the memory 66 once each printing cycle.

The check digit words are intercepted by a void or invalid digit decoder 72. Certain digits are void as indicated when, for example, they represent a binary number equal to decimal six. The decimal six number does not occur successively, and it may be generated by the data source each time the check digit represents a two-digit decimal number. The void digit decoder 72 outputs a valid/invalid signal as a binary bit which is in the first stage of the fifth column 74 of a five column 8-bit shift register 76. The other columns of the register 76 store the check digit word bits $2^0$, $2^1$, $2^2$ and $2^3$. The $2^3$ bit serves as a direction bit indicating the shortest direction which the stepper motor may turn to place the selected decimal check digit in printing position by rotating the check digit numbering wheel 14. A strobe or shift input S for each of the shift register columns is obtained from the lead signal LS. Accordingly, data is shifted through the shift register on each printing cycle.

When the void digit decoder outputs a valid signal, an AND gate 78 is enabled and the check digit word bits are inputted to the shift register stages. When the check digit word is invalid, the AND gate 78 is inhibited. The invalid signal from the void digit decoder is applied through the OR gate 70 to cause the memory 66 to read out the next successive check digit word. For the next successive check digit word, the void digit decoder will decode a valid signal such that the successive check digit word and a bit representing that the previous check digit word was invalid is stored together therewith in the same row of the shift register 76.

The like stages in the shift register columns are connected in eight groups of lines, or 40 lines in total, to switches 82, 84 and 86. The switch 82 is for Channel A and selects that row of the shift register stages which is to provide data for controlling Channel A. The first row may be selected by a 3-bit address input ADRA which is applied to the switch 82. The switches may be binary control switches of the type which are available in integrated circuit form. The other switches 84 and 86 are similar to the switch 82. A different address, ADRB or ADRC, is applied to each of the switches 84 and 86, respectively, such that different rows of shift register stages may be selectively connected to stepper motor controls 90 and 92 for Channel B and Channel C, respectively. The stepper motor controls may have a pulse source (not shown) connected thereto. Depending upon the binary signals $2^0$, $2^1$, $2^2$ and $2^3$ which are applied thereto, different numbers of pulses are generated and the clockwise or counter-clockwise output line is selected on which these pulses are applied. For example, when the $2^0$, $2^1$ and $2^2$ bits of the check digit word are all zeros, no pulses will be applied to either output line ASTPCW or ASTPCCW. The stepper motor 24 then stays in the same position. If the $2^0$ bit only is a binary 1 bit, the $2^1$ and $2^2$ bits being binary 0 bits, 20 pulses are applied on ASTPCW line if the $2^3$ or direction bit is 1 or on the ASTPCCW lines if the $2^3$ direction bit is a 0. Similarly, if only the $2^1$ bit is a binary 1, 40 pulses will be applied to one of the output lines from the stepper motor control 88. If the $2^0$ and $2^1$ bits are 1 while the $2^3$ bit is 0, 60 pulses will be applied to one of the output lines. If only the $2^3$ bit is a 1, 80 pulses will be applied to one of the output lines. If the $2^0$ bit and $2^2$ bit are 1, while the $2^1$ bit is 0, 100 pulses will be applied to one of the output lines. The other combinations of $2^0$, $2^1$ and $2^2$ bits are not used. The VA output is obtained either from the stage 74 of the shift registers 76 or by decoding the condition where the $2^2$ and $2^1$ bits are both 1 and the $2^0$ bit is 0 (a decimal six which corresponds to an invalid check digit). When the invalid check digit appears, the VA output to the OR gate 58 causes the second successive identification number to be presented by the second incrementation of the identification numbering wheels during a printing cycle. The outputting of the control signals from the stepper motor control occurs only when the start signal from its respective channel appears. This is the AST signal in the case of Channel A.

It will therefore be seen that the identification numbering wheels are incremented and the stepper motor is turned the correct number of steps to bring the check digit numbering wheel to the position where valid serial numbers are produced during each printing cycle.

From the foregoing description, it will be apparent that there has been provided improved weighted modulus numbering apparatus which can use higher order weighted modulus systems in generating check digits and may print serial numbers, including such higher order modulus check digits, without interrupting the printing cycle of a printing machine. Variations and modifications in the herein described apparatus, within the scope of the invention, will undoubtedly suggest themselves to those skilled in the art. Accordingly, the foregoing description should be taken as a illustrative and not in a limiting sense.

We claim:

1. Weighted modulus numbering apparatus for printing a check digit with an identification number in successive printing cycles using a weighted modulus system which produces invalid check digits for certain of said identification digits, said apparatus comprising identification number printing means and check digit printing means for presenting a composite number for printing, means operative to increment said identification number printing means to selectively present the first or the second successive identification numbers for printing during each printing cycle, means for generating successive words according to said weighted modulus system representing check digits associated with said successive identification number, including said invalid check digits, means responsive to said identification numbers for providing digital signals representing the validity or invalidity of the check digits therefor, means for storing said successive check digit words with the digital signals representing the validity and invalidity thereof, each said printing cycle, and for storing the next successive one of said check digit words with said digital signal when said digital signal represents an invalid check digit word, first control means for said identification number incrementing means for causing it to increment to said second successive identification number when said digital signal represents said invalid check digits and to said first successive first identification number when said digital signal represents said valid check digits, and second control means for operating said check digit printing means in response to said check digit word in said storing means.

2. The apparatus is defined in claim 1 wherein means are provided responsive to said check digit validity-invalidity digital signals for causing the check digit word corresponding to the check digit for the next successive identification number to be stored in said storing means when said check digit validity-invalidity signal represents an invalid check digit.

3. The apparatus is defined in claim 2 wherein first memory means and second memory means are provided, said first memory means having storage for said plurality of said words from said generating means which represents said check digits for a plurality of successive identification numbers, said second memory means having storage for the check digit words and for said check digit validity-invalidity signals, means for successively reading the said words from said first memory on a first in first out basis on each of said successive printing cycles, void digit decoder means responsive to said words read out of said first memory for providing said validity-invalidity signals for storage in said second memory means, means operated by said decoder means for storing in said second memory means said words read out of said first memory on each of said cycles unless said words represent an invalid check digit, and means operated by said decoder means for reading out the word corresponding to the check digit for the next successive identification number from said memory means and storing it in said second memory means with said validity-invalidity signal when said validity-invalidity signal represents an invalid check digit.

4. The apparatus is defined in claim 3 wherein said second memory means is a shift register having a plurality of columns with a plurality of stages in each column for each check digit word and its validity-invalidity signal, means for advancing said words along said stages each printing cycle, a plurality of said identification number and check digit printing means, a plurality of said first and second control means each for a different one of said printing means, and means for providing said check digit word and validity signals from different ones of said stages in said columns to different ones of said plurality of control means for enabling the printing of different identification numbers with their check digits upon each printing cycle.

5. The apparatus is defined in claim 1 wherein said identification number printing means comprises a plurality of numbering wheels each bearing a plurality of successive digits along the periphery thereof, a mechanism interconnecting said wheels cyclically operative to increment the numbers represented by the digits thereon when cycled, a spring clutch brake having a solenoid, said spring clutch brake having a rotatable element coupled to said mechanism to cause the mechanism to cycle when said element makes a revolution, a shaft which makes one revolution each of said printing cycles, means coupling said shaft of said element through said clutch to provide two revolutions thereof each printing cycle, means coupled to said shaft to operate said solenoid to engage said clutch and cause said element to make a single revolution during each printing cycle, and means operated by said second control means to operate said solenoid to cause said element to make a double revolution during each printing cycle whereby said identification numbering wheels are incremented once when the check digit for the first successive identification number is valid and twice when that check digit is invalid.

6. The apparatus as defined in claim 5 wherein said means providing two revolutions each cycle comprises a first pulley on said clutch, a second pulley on said shaft, said second pulley being twice the diameter of said first pulley, and an endless belt around said pulleys.

7. The apparatus as defined in claim 6 wherein said means coupled to said shaft to operate said solenoid comprises a cam, a switch following said cam, said cam being shaped to actuate said switch once each cycle of rotation thereof, and means for applying operating current to said solenoid via said switch or in response to said digital signal representing an invalid check digit.

* * * * *